United States Patent [19]

King et al.

[11] Patent Number: 5,236,370
[45] Date of Patent: Aug. 17, 1993

[54] ELECTRICAL SYSTEM FOR INTERIOR SPACE-DIVIDING SYSTEM

[75] Inventors: Steven J. King, Park Township, Ottawa County; David E. Emery, Laketon Township, Muskegon County, both of Mich.

[73] Assignee: Haworth, Inc., Holland, Mich.

[21] Appl. No.: 894,399

[22] Filed: Jun. 5, 1992

[51] Int. Cl.$^5$ ............................................. H01R 25/16
[52] U.S. Cl. ..................................... 439/215; 439/171
[58] Field of Search ............................. 439/207–216, 439/170, 171, 174

[56] References Cited

U.S. PATENT DOCUMENTS

| | | | |
|---|---|---|---|
| 4,060,294 | 11/1977 | Haworth et al. | 439/215 |
| 4,367,370 | 1/1983 | Wilson et al. | 439/215 |
| 4,370,008 | 1/1983 | Haworth et al. | 439/165 |
| 4,377,724 | 3/1983 | Wilson | 439/211 |
| 4,429,934 | 2/1984 | Vanden Hoek et al. | 439/207 |
| 4,666,223 | 5/1987 | Tillmann | 439/215 |
| 4,703,386 | 10/1987 | Speet et al. | 361/56 |
| 4,771,583 | 9/1988 | Ball et al. | 174/48 |
| 4,775,328 | 10/1988 | McCarthy | 439/211 |
| 4,781,609 | 11/1988 | Wilson et al. | 439/215 |
| 4,814,941 | 3/1989 | Speet et al. | 361/334 |
| 4,911,651 | 3/1990 | Jego et al. | 439/207 |
| 4,952,164 | 8/1990 | French et al. | 439/215 |
| 5,038,005 | 8/1991 | Hohorst et al. | 439/171 |
| 5,087,207 | 2/1992 | Byrne | 439/215 |
| 5,092,786 | 3/1992 | Juhlin et al. | 439/215 |
| 5,092,787 | 3/1992 | Wise et al. | 439/215 |
| 5,096,431 | 3/1992 | Byrne | 439/215 |
| 5,158,472 | 10/1992 | Juhlin | 439/215 |

OTHER PUBLICATIONS

SunarHauserman "RACE Technical Planning Guide", 36 pages, May 1986.

Primary Examiner—Gary F. Paumen
Attorney, Agent, or Firm—Flynn, Thiel, Boutell & Tanis

[57] ABSTRACT

An electrical system for an interior space-dividing system which, in a preferred embodiment, constitutes an eight-wire, three-circuit system. The electrical system is prefabricated and includes elongate harnesses mounted within channels which extend interiorly or portable space-dividing members. Adjacent harnesses are electrically joined by flexible electrical jumpers which create pluglike connections with power blocks provided on the ends of adjacent harnesses. Receptacle units are removably connectable to at least one side of each power block, and have circuit-selecting capability to facilitate access to all three circuits from adjacent work areas. The receptacle unit includes at least two exteriorly accessible receptacles of conventional configuration associated with a front face of the receptacle unit housing, and the housing internally includes independent sets of three conductors each respectively associated with one of the receptacles and each set having independent circuit-selecting structure associated therewith so that each of the two receptacles associated with a single receptacle unit can be independently circuit selected.

15 Claims, 9 Drawing Sheets

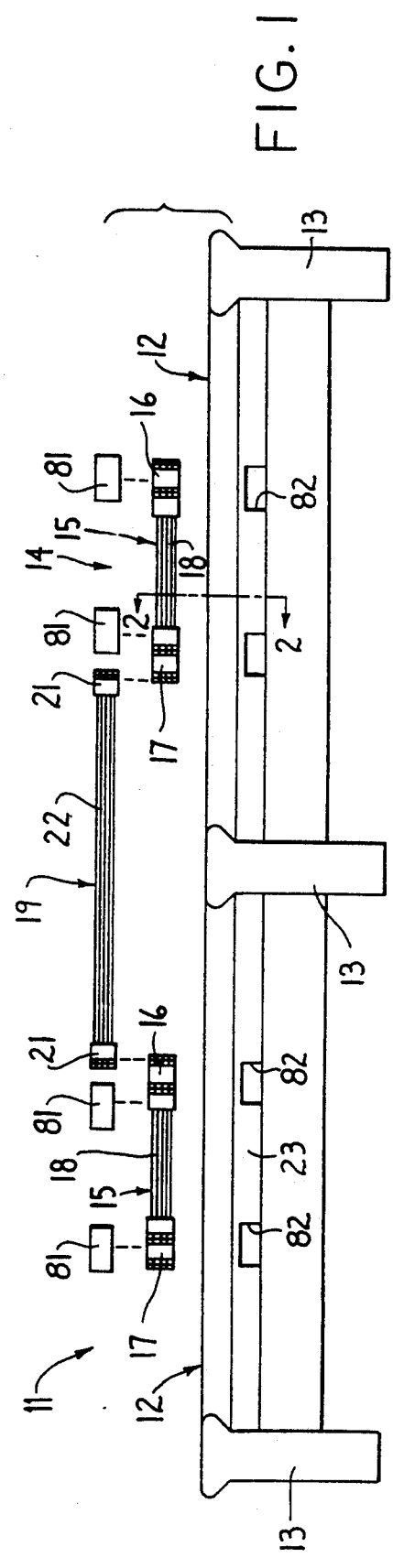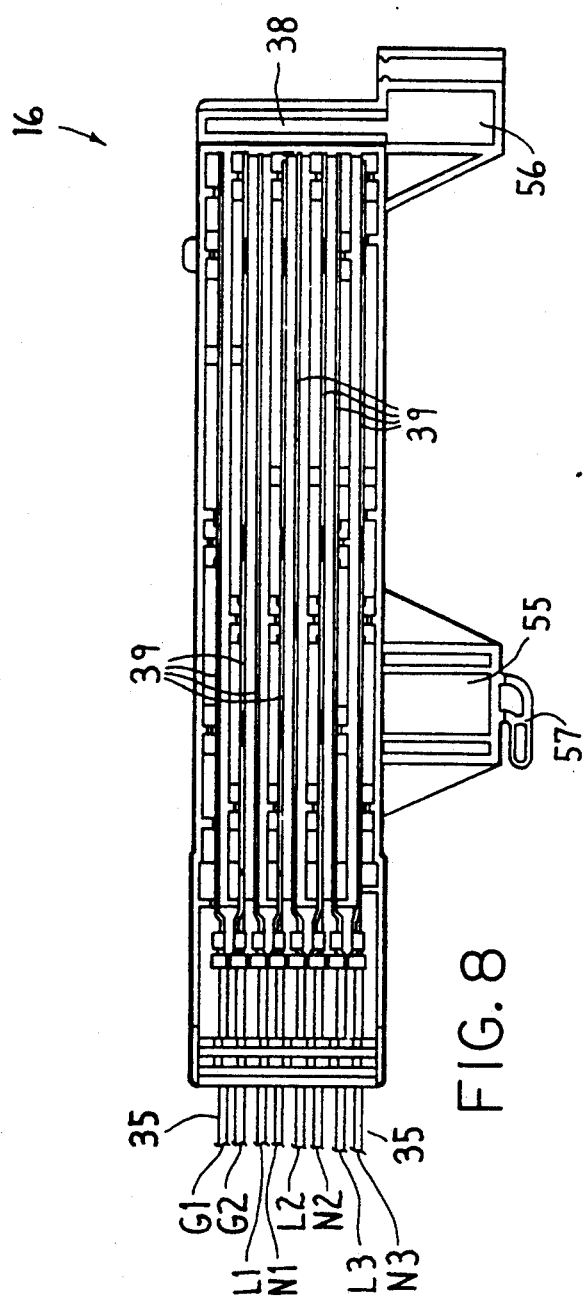

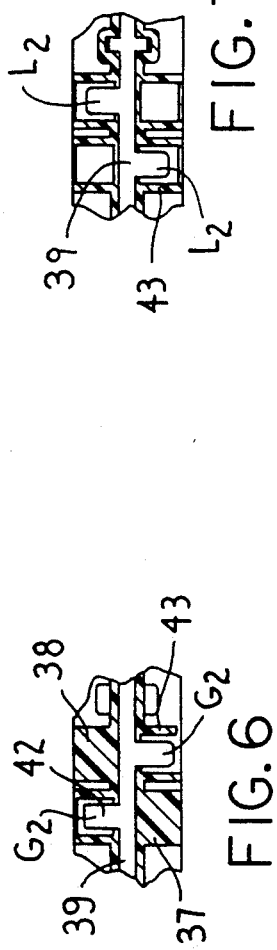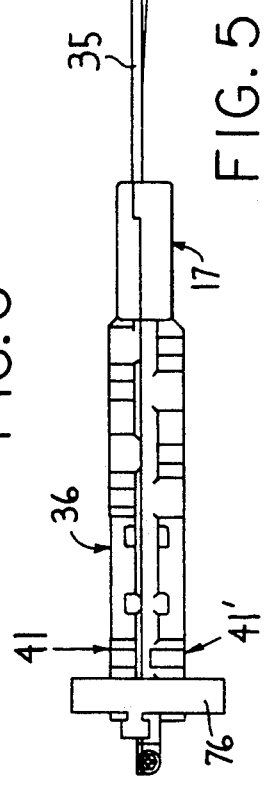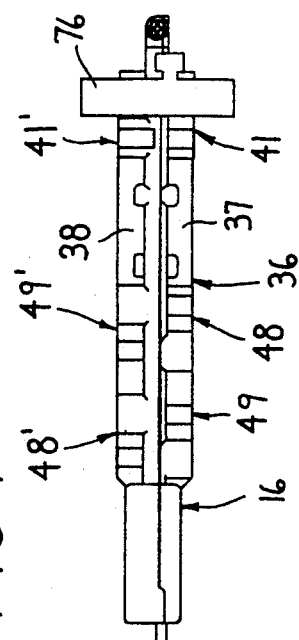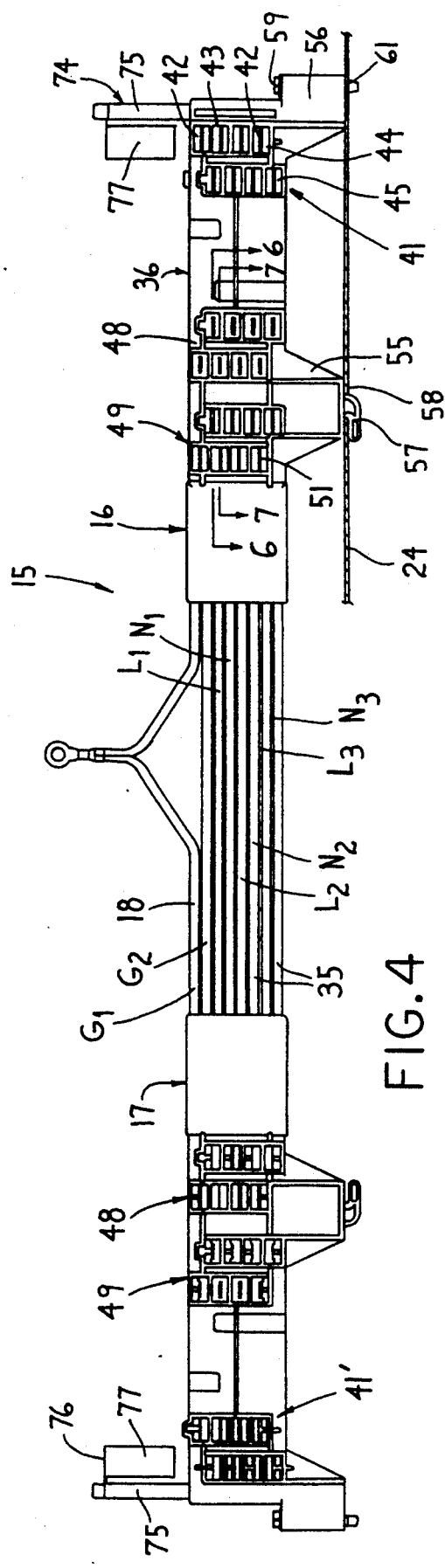

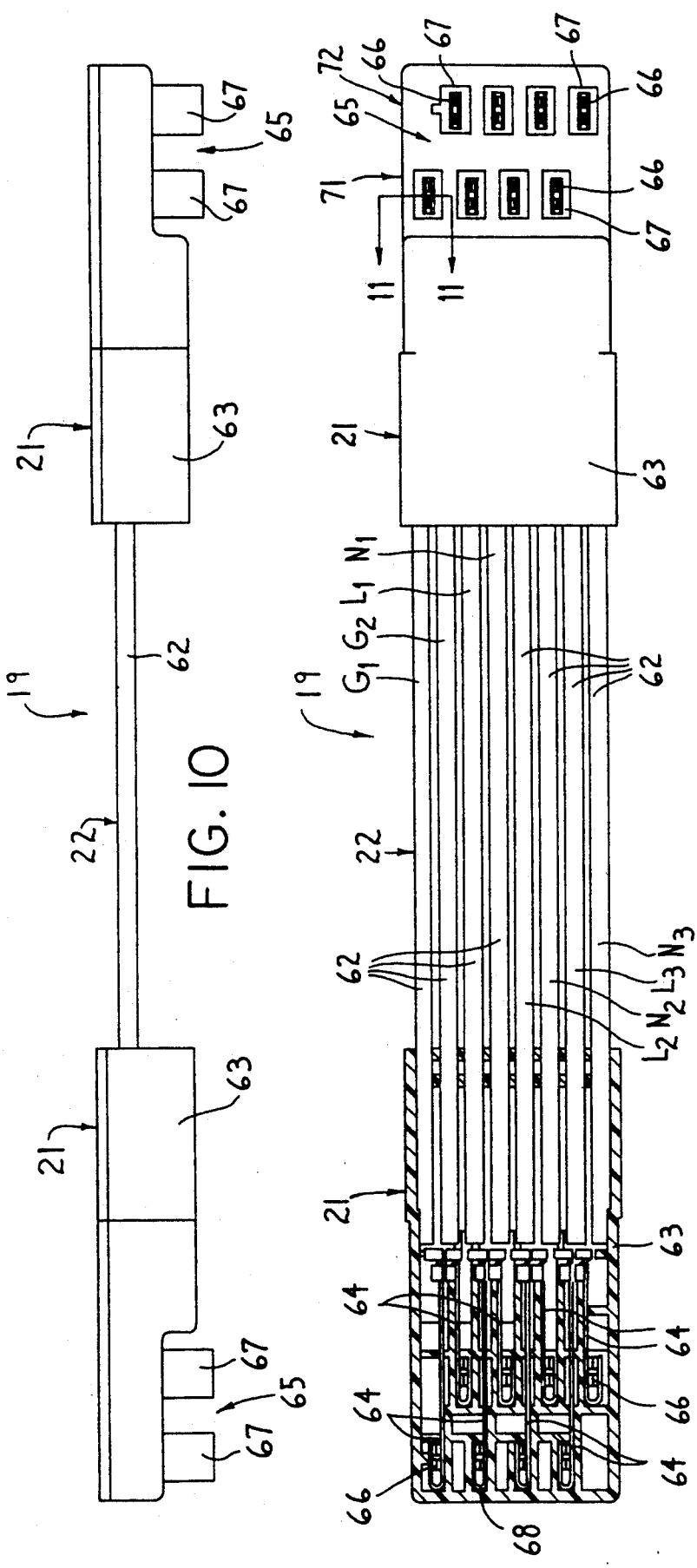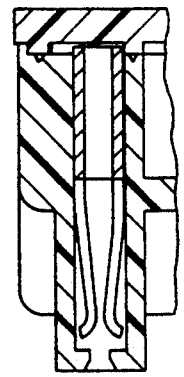

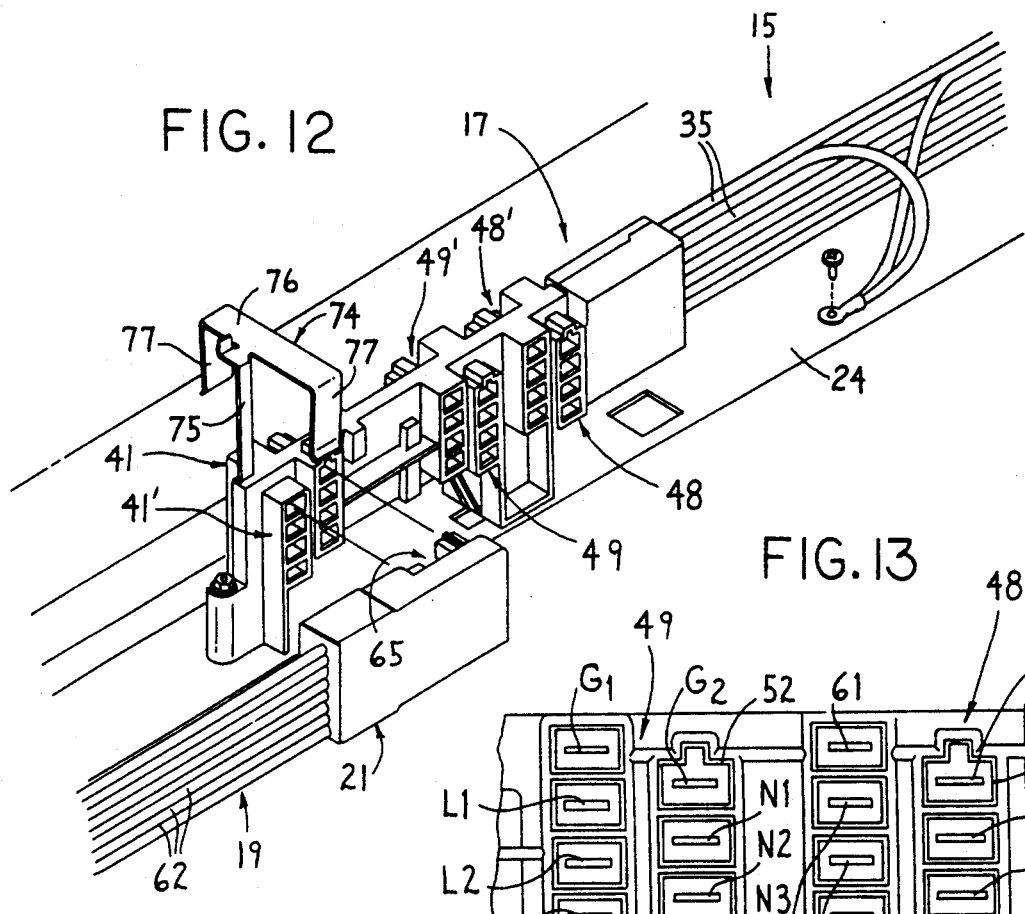

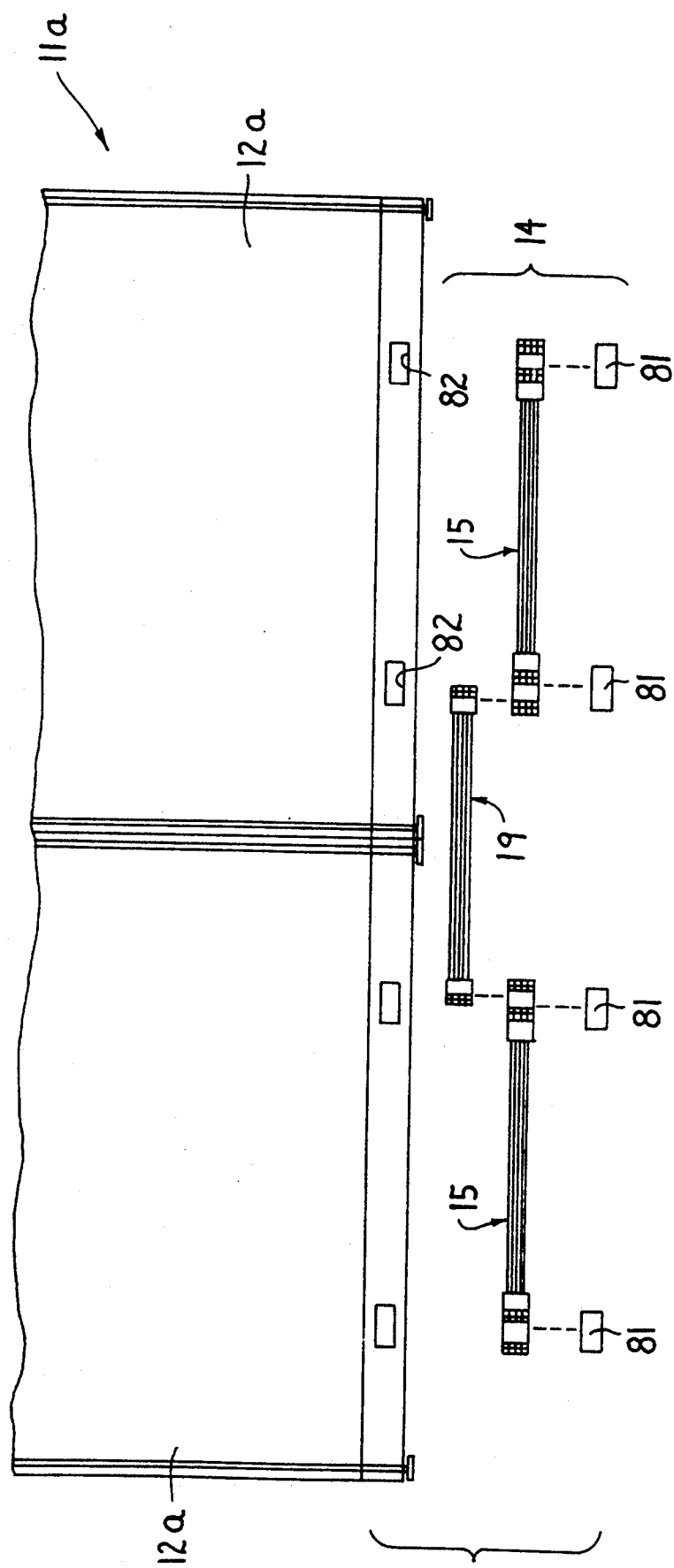

ELECTRICAL SYSTEM FOR INTERIOR SPACE-DIVIDING SYSTEM

FIELD OF THE INVENTION

This invention relates to an improved multiple circuit electrical system for use in an interior space-dividing system for offices and, more particularly, to an improved circuit-selectable receptacle unit for such system.

BACKGROUND OF THE INVENTION

Office interiors are conventionally divided into small work areas by portable interior space-dividing arrangements which typically involve upright space-dividing members such as panels or equivalents, which said members are generally horizontally serially connected to define individual workstations. The space-dividing members are conventionally provided with prefabricated electrical systems associated therewith to simplify supply of electricity to electrified equipment which is utilized in the individual workstations. The space-dividing members conventionally support thereon other furniture accessories utilized in the workstation such as files, worksurfaces and the like.

U.S. Pat. No. 4 060 294 and 4 370 008, both owned by the Assignee of this invention, disclose therein interior space-dividing systems defined by upright wall panel assemblies which incorporate prefabricated electrical systems which extend longitudinally throughout serially-connected panels for simplifying the accessing of electrical energy to workstations. U.S. Pat. No. 4 771 583, also owned by the Assignee hereof, illustrates another space-dividing system wherein the upright space-dividing members constitute horizontally-elongate beams which extend between upright support posts, which beams permit additional space-dividing acoustical panels to be mounted thereabove for increasing the height of the space-dividing members. The horizontally-elongate beams of this latter system also accommodate a prefabricated electrical system which is disposed within elongate channels which extend interiorly of the beams. In the electrical system of the aforesaid '583 patent, the system provides multiple circuit capability but accessing of the circuits is by means of removable receptacle units dedicated to a single circuit, whereby different receptacle units such as "a" and "b" units are necessary in order to individually connect to two different circuits.

To improve accessibility to electrical circuits associated with electrical systems of the type employed within space-dividing systems, the Assignee developed improved receptacle units having circuit-selecting capability so that a single receptacle unit can be manually selectably adjusted for connection to a selected one of plural circuits as associated with the electrical system. Such circuit-selecting receptacle units are described in U.S. Pat. Nos. 4 367 370, 4 666 223 and 4 781 609, all owned by the Assignee hereof. While the receptacle units of the aforesaid patents have proven highly desirable and successful in utilization, nevertheless the present invention provides still further improvements associated with such circuit-selecting receptacle units.

Accordingly, it is an object of this invention to provide an improved electrical system for a space-dividing system which, in an improved embodiment, constitutes an eight-wire, three-circuit system. The electrical system is prefabricated and includes elongated harnesses which are mounted within channels which extend interiorly of the space-dividing members. The harnesses can be either factory or field installed, and adjacent harnesses are electrically joined by flexible electrical connectors or jumpers which create a pluglike connection with the power blocks provided on the ends of adjacent harnesses. Receptacle units are removably connectable to at least one and preferably both sides of each power block, and have circuit-selecting capability to facilitate access to all three circuits from adjacent work areas.

In the improved electrical system, as aforesaid, the receptacle unit preferably includes at least two exteriorly accessible receptacles of conventional configuration associated with a front face of the receptacle unit housing, and the housing internally includes independent sets of three conductors each respectively associated with one of the receptacles and each set having independent circuit-selecting structure associated therewith so that each of the two receptacles associated with a single receptacle unit can be independently circuit selected.

In the improved electrical system, as aforesaid, the receptacle unit and the power block have cooperating connector portions which create a pluglike electrical connection therebetween. This pluglike connection includes a pair of connector portions associated with the power block, and each connector portion communicates with all wires of the power block so as to access all circuits. The receptacle unit also has two connector parts which are respectively engagable with the two connector portions on the power block. The connector parts on the receptacle unit are individually movable for circuit selection, and each couples solely to the three conductors associated with the respective receptacle.

In the improved electrical system, as aforesaid, the connector part associated with each receptacle preferably includes two guide parts adapted to create a pluglike engagement with corresponding two guide parts on the power block, the latter two guide parts having grounds contacts associated therewith. The two guide parts on the receptacle unit connector part, however, are provided with only a single ground terminal therein, which terminal is located in one or the other guide part depending upon whether connection to a common or an isolated ground is desired.

In the improved electrical system, as aforesaid, the connectors as provided on the power blocks and flexible power jumpers are preferably disposed in an arrangement whereby two sidewardly-adjacent vertically-elongate rows of contacts are provided, with each row having one of the two ground connects associated therewith, with one row having three live or "hot" contacts associated therewith, and the other row having three neutral contacts associated therewith. The sidewardly-adjacent rows are preferably disposed in vertically staggered or offset relationship with respect to one another to prevent improper engagement of coacting connectors.

Other objects and purposes of the invention will be apparent to persons familiar with systems of this general type upon reading the following specification and inspecting the accompanying drawings.

BRIEF DESCRIPTION OF THE DRAWINGS

FIG. 1 is a diagrammatic elevational view, partially in vertically exploded relationship, of an upright space-dividing system for use in offices and the like.

FIG. 4 is a side elevational view of the electrical harness which mounts within the space-dividing member.

FIG. 5 is a top view of the harness illustrated in FIG. 4.

FIGS. 6 and 7 are enlarged, fragmentary sectional views taken substantially along lines 6—6 and 7—7, respectively, in FIG. 4.

FIG. 8 is an enlarged side elevational view of the power block associated with one end of the harness, with one side housing part removed to illustrate the internal structure.

FIG. 9 is a side elevational view, partially in cross section, of a flexible power connector or jumper which is used for electrically joining the power blocks of adjacent harnesses.

FIG. 10 is a top view of the power jumper illustrated in FIG. 9

FIG. 11 is an enlarged, fragmentary sectional view taken substantially along line 11—11 in FIG. 9.

FIG. 12 is a fragmentary perspective view illustrating the relationship between adjacent cooperating ends of the harness and power jumper.

FIG. 13 is an elevational view which diagrammatically illustrates the pair of connector portions as provided on each side of the power block for cooperation with a removable receptacle unit.

FIGS. 14 and 15 are perspective views which respectively illustrate the front and rear sides of a receptacle unit according to the present invention.

FIG. 19 is a view similar to FIG. 1 but showing a variation.

Figure 2:
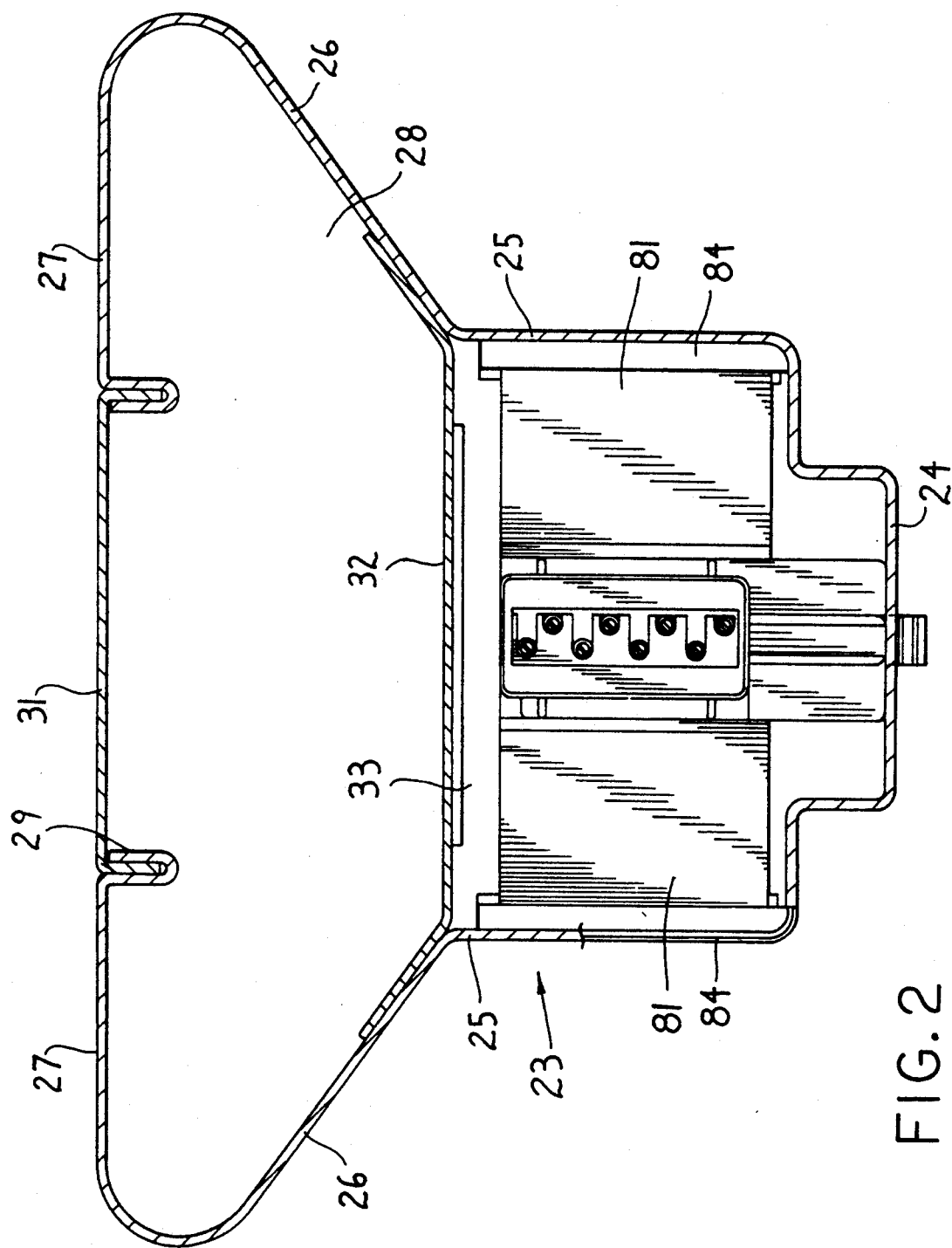
FIG. 2 is an enlarged sectional view taken through a space-dividing member substantially along line 2—2 in FIG. 1.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Referring to FIG. 1, there is illustrated an interior space-dividing system 11 which includes a plurality of space-dividing assemblies or elements 12 which, in the illustrated embodiment, comprise horizontally-elongate beams which are joined to and supported in upright relationship by intermediate upright posts 13 which have lower ends supported on a floor. The system 11 has a preassembled electrical system 14 associated therewith, which systems include an elongate electrical harness 15 which extends interiorly along the individual space-dividing member 12 and includes substantially identical power blocks or terminals 16 and 17 joined together by an elongate electrical conductor means 18. The electrical system 14 also includes a flexible power connector or jumper 19 which has end parts 21 joined by elongate electrical conductor means 22, whereby the end parts 21 create a pluglike electrical engagement with the power blocks of adjacent harnesses 15 for creating an electrical connection therebetween.

To accommodate the electrical system 14, the space-dividing member 12 comprises a horizontally-elongate channel-like housing 23 (FIG. 2) which includes a base wall 24 from which a pair of generally parallel sidewalls 25 project vertically upwardly. These sidewalls 25, adjacent their upper ends, join to flared sidewalls 26 which diverge outwardly as they project upwardly. These flared sidewalls 26 adjacent upper ends thereof are bent inwardly to define a generally horizontal top wall 27. The flared sidewalls 26 and top wall 27 cooperate to define therein a horizontally-elongate channel 28 for accommodating communication cables, with access to this channel being through a top passage 29 as defined in the top wall 27, which passage 29 can be closed by a removable top cover 31. A further removable interior cover 32 is located so as to extend across the interior of the housing at the interface between the sidewalls 25 and 26. This cover 32 defines the bottom of the top channel 28, and cooperates with the sidewalls 25 and base wall 24 for defining a generally closed elongate channel 33 for accommodating the electrical system 14 therein.

The electrical system 14, in the illustrated and preferred embodiment, is a three-circuit system defined by at least eight conductors 35 which extend between and electrically join the power blocks 16-17 defined at opposite ends of the harness. The conductors 35, as illustrated by FIG. 4, include ground conductors G1 and G2 which are generally referred to as the common and isolated grounds respectively, neutral conductors N1, N2 and N3, and live or "power" conductors L1, L2 and L3. The conductors L1 and N1 define a first circuit, conductors L2 and N2 define a second circuit, and conductors L3 and N3 define a third circuit. Any of these circuits can be associated with ground G1 or G2.

The conductors 35 electrically join to the power blocks 16-17 each of which includes a hollow housing 36 which is of a thin but generally upright blocklike configuration and is elongated horizontally longitudinally relative to the space-dividing beam 12. This power block housing 36 is defined by opposed housing parts 37-38 which are suitably molded of a plastics material and cooperate to define therein interior chambers in which are positioned a plurality of electrically conductive plates 39. These electrically conductive plates 39 are, as illustrated by FIG. 8, disposed in generally vertically spaced and electrically isolated relationship to one another within the respective housing, and each plate 39 is electrically joined to one end of a respective electrical conductor 35.

Each power block 16-17 has a pair of substantially identical electrical connecting portions 41, 41' disposed so as to face horizontally outwardly from opposite sides of the housing 36 adjacent to the end thereof which is remote from the conductors 35. Each connecting portion 41 includes a set of conductive terminals (i.e. prongs or blades) 42 which projects sidewardly out of the housing so as to be externally accessible, with each conductive prong 42 being surrounded by a generally tubular protective shroud 43 which is formed of plastic integral with the housing and which projects outwardly from the sidewall thereof. The connecting portion 41, in the illustrated embodiment, is defined by a set of eight conductive prongs 42, one being associated with each of the conductive plates 39. The conductive prongs 42 and surrounding shrouds 43, in the illustrated and preferred embodiment, are disposed in two vertically extending rows 44 and 45 which are disposed horizontally and sidewardly adjacent one another, with each row 44 and 45 having four of the conductive prongs 42 associated therewith. The prongs within each row 44 and 45 are substantially uniformly vertically spaced apart, and the prongs in the row 45 are offset vertically downwardly relative to the prongs in the row 44. The row 44 in vertically descending order includes prongs 42 which are associated with the conductive plates 39 which couple to the conductors G1, L1, L2 and L3, whereas the prongs in vertically descending order in the row 45 are part of the plates 39 which are respectively connected to the conductors G2, N1, N2 and N3.

The connecting portions 41 and 41' as disposed on opposite sides of the power block are provided with different alignment keys or ribs to prevent improper hook-up of the electrical system.

Each power block 16, 17 also has a further pair of electrical connector portions 48 and 49 (FIGS. 4, 5 and 13) associated with and projecting outwardly for exterior access from each side thereof. These connector portions 48 and 49 are disposed in horizontally sidewardly-spaced relationship on the sidewall of the power block and each includes a plurality, here eight, of conductive contacts or terminals formed as prongs or blades 51 individually positioned within protective plastic shrouds 52 which are integrally joined to and project from the sidewall of the housing. Each of the prongs 51 project sidewardly from a respective one of the conductive blades 39. The set of conductive blades 51 associated with each of the connector portions 48 and 49 are disposed in two sidewardly-adjacent vertically extending rows 53 and 54, each having four conductive blades 51 associated therewith in generally uniformly vertically-spaced relation, with the two rows being vertically staggered or offset relative to one another. The eight conductive blades defining each of the connector portions 48 and 49 are positioned and suitably connected to the conductive plates 39 and conductors 35 so as to define ground, live and neutral contacts substantially as illustrated by FIG. 13. Each of the connector portions 48 and 49 are substantially identical to but mirror images of the connecting portion 41.

Each power block housing 36, as illustrated by FIG. 4, includes downwardly projecting leg parts 55 and 56 disposed adjacent opposite ends thereof for permitting securement of the power block to the base wall 24 of the channel-like housing, while at the same time maintaining the main part of the power block and specifically the connector portions 41, 48 and 49 in vertically spaced relationship above the base wall 24. The one leg part 55 has an L-shaped hook 57 projecting downwardly from the lower free end thereof, which hook is adapted to project through an elongate slot 58 formed in the base wall 24. The other leg part 56 has a suitable fastener such as a threaded screw 59 projecting vertically downwardly therethrough for securing engagement within an opening 61 which projects through the base wall 24. With this arrangement, the power block at each end of the harness 15 can be moved vertically downwardly of the channel-like housing 23 to insert the L-shaped hook 57 through the slot 58, following which the power block is horizontally slidably moved longitudinally of the channel-like housing (leftwardly in FIG. 4) to cause the L-shaped hook 57 to engage under the base wall 24. This then results in the screw 59 being generally aligned with the opening 61, whereby the screw can be threaded downwardly for engagement with the opening to hence fixedly secure the power block to the base wall.

Considering now the flexible power connector or jumper 19, and referring to FIGS. 9–11, the connector means 22 is also defined by a plurality of individual conductors 62 which extend between the end parts 21. Since the overall electrical system is an eight-wire system, there are eight such conductors 62 in the illustrated embodiment, which conductors constitute grounds G1 and G2, neutrals N1, N2 and N3 and lives L1, L2 and L3, consistent with the arrangement of conductors 35 in the harness 15.

Each end part 21 of the power jumper 19 includes a hollow housing 63 of a plastic material having a plurality of electrically conductive plates 64 mounted interiorly thereof in vertically spaced and electrically isolated relationship to one another, which plates 64 correspond in number and are individually electrically coupled to the adjacent ends of the conductors 62.

Each end part 21 of the power jumper 19 also has an electrical connecting part 65 associated therewith and projecting horizontally sidewardly from the housing 63. This connecting part 65 includes a plurality of individual electrical contacts or terminals 66, with each contact 66 being surrounded by a generally tubular plastic shroud 67 which is integrally joined to and projects outwardly from the sidewall of the housing 63. Each contact 66 is integrally joined to and projects sidewardly from a respective one of the conductive plates 64. Each plate 64 adjacent to the free end thereof is provided with a generally U-shaped configuration 68 having upper and lower plate portions each provided with a conductive blade 69 projecting sidewardly therefrom into the respective shroud 67. The contact 66, in the illustrated embodiment, is defined by the opposed pair of conductive blades 69 which effectively acts as cantilevered springs and define a narrow gap therebetween for receiving and creating both structural and electrical contact with a conductive prong 42 associated with one of the connecting portions 41 or 41' on the power blocks.

The eight contacts 66 and surrounding shrouds 67 as defining the connecting part 65 are again defined within two sidewardly-spaced rows 71, 72 which project vertically, with each row containing therein four contacts 66 which are substantially uniformly vertically spaced. The individual contacts in vertically descending order in row 71 are the G1, L1, L2 and L3 contacts, and the individual contacts in vertically descending order in row 72 are the G2, N1, N2 and N3 contacts. The connecting part 65 is designed to be compatible with and hence create a pluglike structural and electrical engagement with one of the connecting portions 41, 41' provided on the power block 16 or 17 to create electrical continuity throughout the eight conductors which define the electrical system. The tubular shrouds 67 associated with contacts 66 are adapted to slidably telescope into the tubular shrouds 43 which surround the conductive blades 42, and simultaneous therewith the conductive blades 41 project through the end openings in the shrouds 67 so as to project between the blades 69 defining the contacts 68 to create electrical engagement therewith.

Each power block 16-17 also has a locking element 74 (FIGS. 4 and 12) associated therewith for preventing separation between the power block 16, 17 and the power jumper end parts 21 when such end parts are plugged into one or both sides of a power block. This locking element 74 is of a generally upright T-shaped configuration and includes a vertically extending base leg 75 which is vertically slidably accommodated within an elongate interior slot formed in the power block housing adjacent the free end thereof. The base leg 75 adjacent a lower end thereof is preferably provided with a resilient locking tang projecting sidewardly of the base leg to prevent the base leg from being lifted upwardly out of engagement with the power block housing. This base leg 75, at its upper end, has a generally downwardly-opening U-shaped yoke 76 secured thereto and extending sidewardly relative to the longitudinally extending direction of the system. Yoke 76 has a pair of downwardly cantilevered side legs 77 which are spaced apart by a distance which approximately corresponds to the overall width of the power block when the latter has a pair of end parts 21 engaged with the pair of connecting portions 41, 41' provided on opposite sides thereof. The locking element 74 can be vertically slidably displaced downwardly so that the top wall of the yoke 76 substantially abuts the top of the power block, and the side legs 77 then project downwardly to snugly engage the exterior or front wall of the housings 63 to prevent separation between the engaged connector portions 41, 41' and 65. Engagement of locking element 74 is further secured in the locking position by the removable cover 32. This prevents an accidental separation of the power jumper from the power block, and also functions as a safety check to ensure that the connector portions 41, 41' and 65 are properly engaged with one another during assembly since the locking element 74 will not move vertically downwardly into a proper securing position unless the power block and power jumper are properly coupled together.

The electrical system 14 also includes receptacle units 81 (FIGS. 14-18) which are adapted to be electrically and mechanically coupled to the connector portions 48-49 provided on the power blocks to provide convenient electrical access for plugging in external devices such as lights, computers, and similar electrical equipment of the type conventionally utilized in an office environment. This receptacle unit 81 according to the present invention is designed to provide, within a single receptacle unit, at least first and second plug-receiving receptacles of conventional configuration which can be individually selected for connection to the same or different electrical circuits. Further, the construction of the receptacle unit is such that, by providing the unit with one of two different types of conventional interior ground terminals, with separate ground terminals being provided for each of the receptacles associated with the unit, the two receptacles can be coupled to either the same or different grounds, in addition to the previously-mentioned circuit selecting capability.

Figure 3:
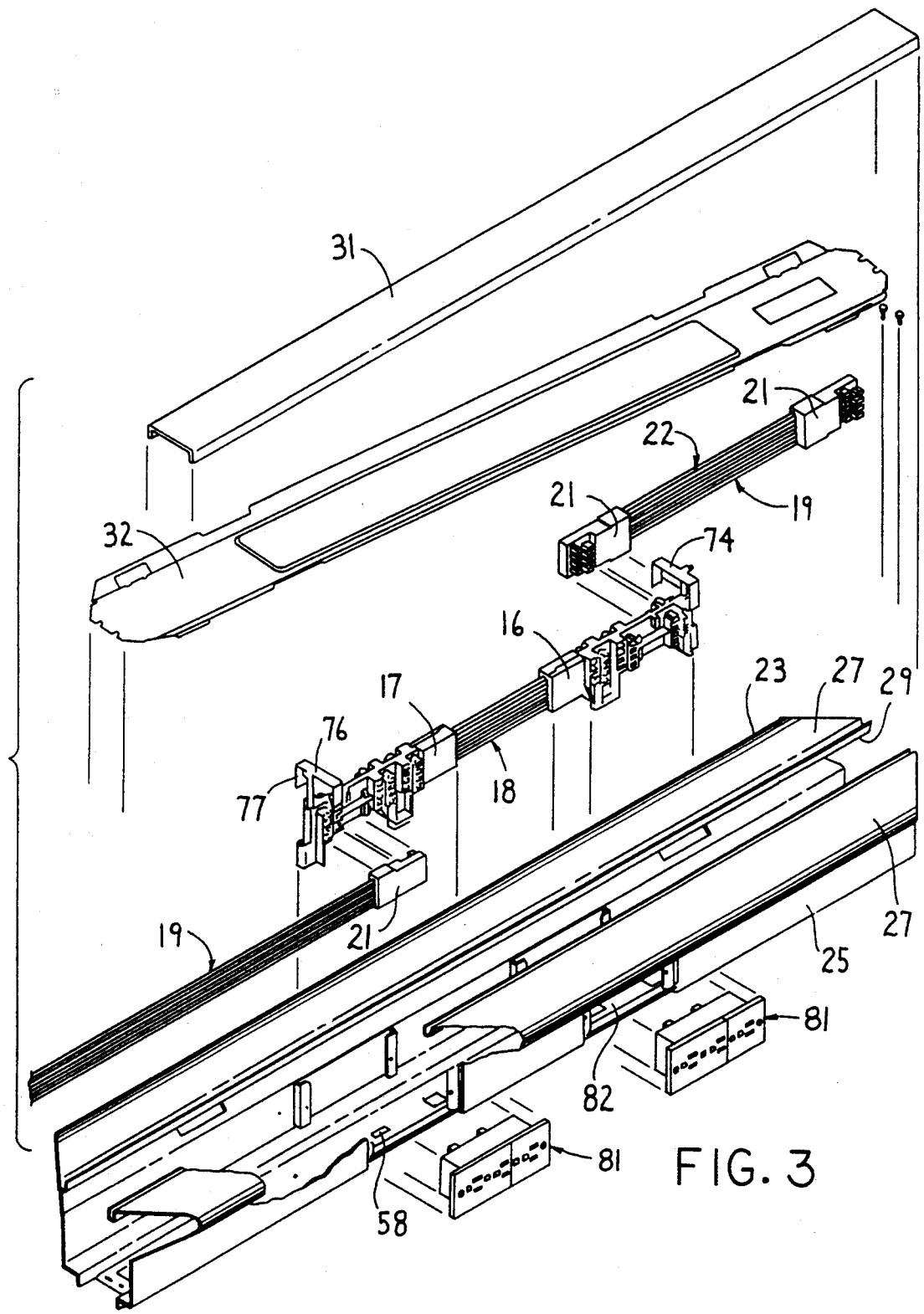
FIG. 3 is an exploded perspective view, partially broken away, of a space-dividing member having an electrical system of the present invention associated therewith.
Figure 16:
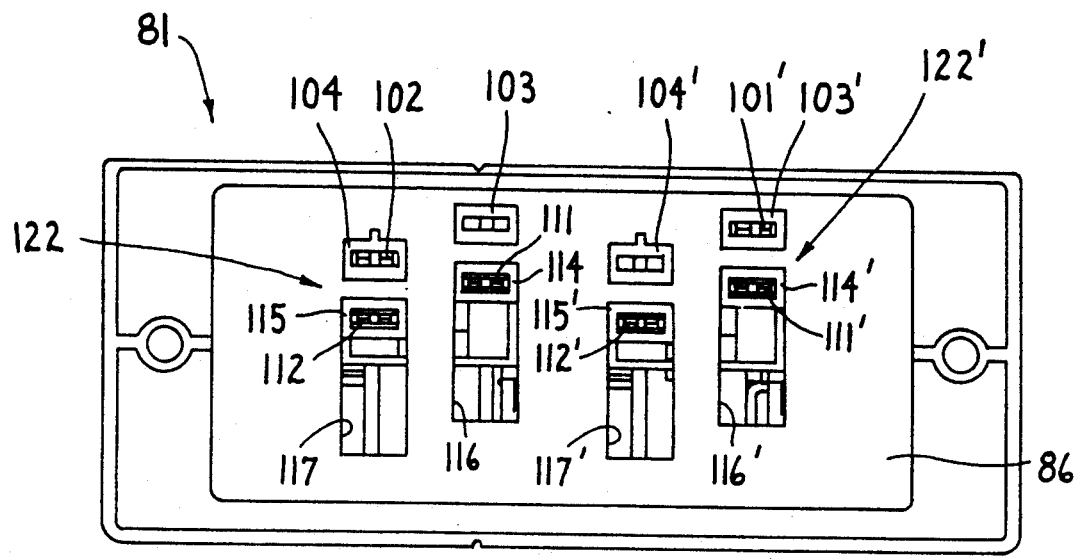
FIG. 16 is a rear elevational view of the receptacle unit.
Figure 17:
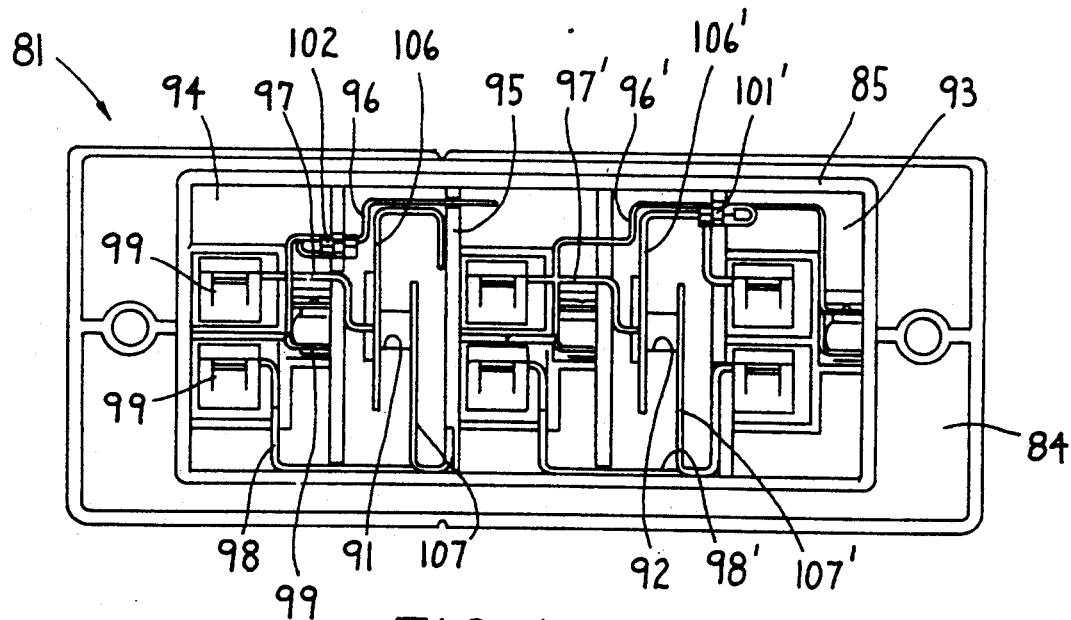
FIG. 17 is a rear elevational view of the receptacle unit with the rear cover removed.
Figure 18:
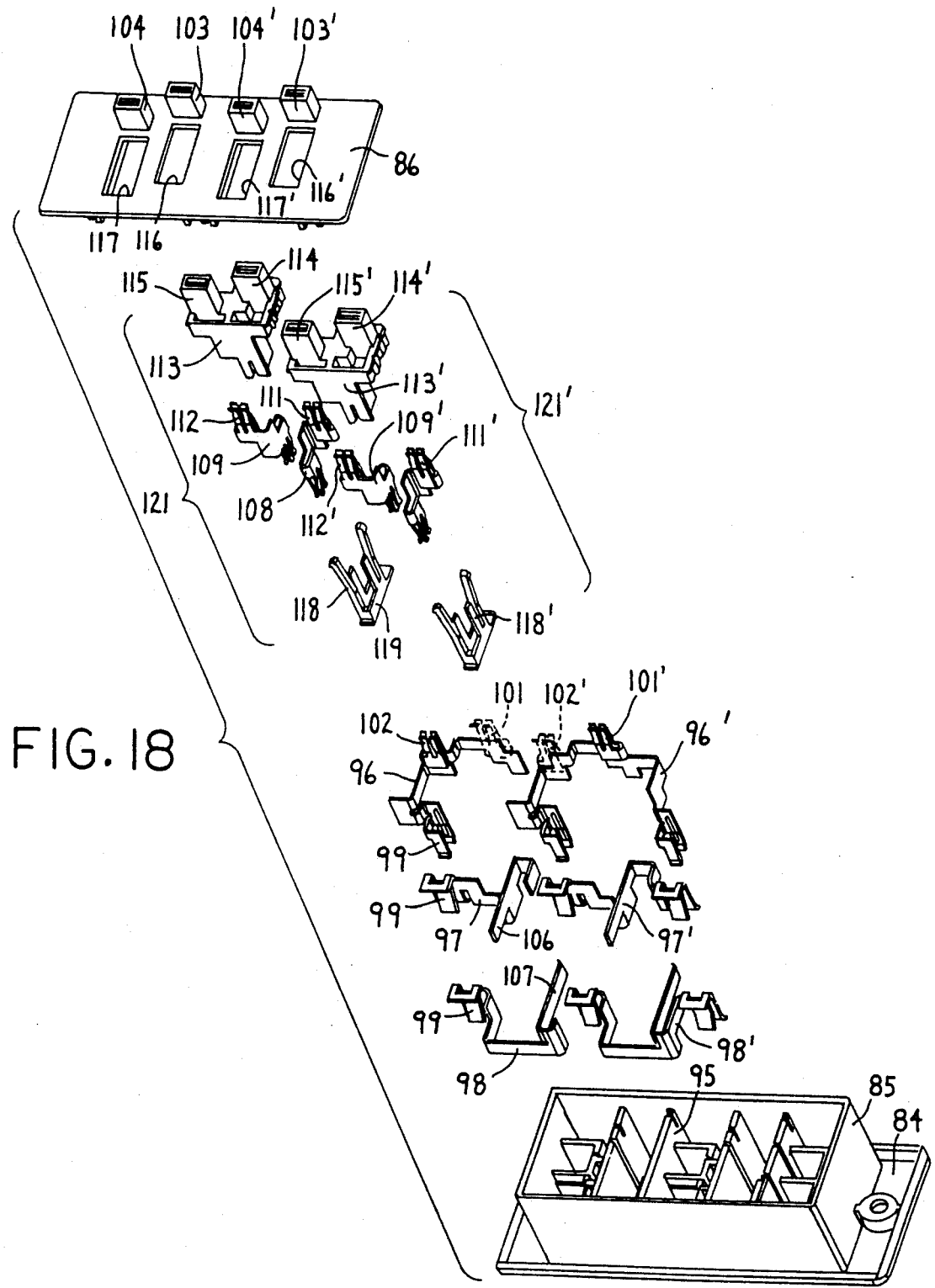
FIG. 18 is an exploded perspective view, taken generally from the rear of the receptacle unit.

Considering now the construction and function of the receptacle unit 81 in greater detail, such unit is adapted to be positioned within an opening 82 (FIG. 3) provided in the housing sidewall 25 so that a front face of the receptacle unit is substantially flush with the sidewall and exteriorly accessible. The receptacle unit projecting inwardly into the channel-like housing for creating a pluglike engagement with the connector portions 48 and 49 provided on the power block 16 or 17.

The receptacle unit 81 includes a rigid housing 83 generally constructed of plastic and having a platelike front wall 84 which is rigidly joined to and extends perpendicularly across one end of a rearwardly-projecting tubular sidewall 85. The rearward end of sidewall 85 is normally closed by a platelike rear wall 86.

The front plate 84 of the receptacle unit has first and second sets of openings 87 and 88, respectively, extending therethrough. The first opening set 87 defines a first electrical receptacle opening of conventional configuration, namely a three-hole receptacle opening having two spaced blade-receiving openings L' and N' for receiving the power and neutral blades of a conventional electrical plug, and a conventional D-shaped opening G' for accommodating the ground prong of a conventional electrical plug.

The other opening set 88 defines a second receptacle which is also a three-hole set for accommodating a conventional two or three prong electrical plug. The receptacle defined by opening set 88 is normally identical to the receptacle defined by opening set 87. In the illustrated embodiment, the opening set 88 includes two identical three-hole openings disposed in sidewardly adjacent relationship for defining two identical receptacles, although the provision of two such receptacles within the opening set 88 is obviously a matter of choice.

Front wall 84 of the receptacle unit housing preferably has some form of visual indicator for readily visually distinguishing the two opening sets 87 and 88, which distinguishing indicator in the illustrated embodiment constitutes a groove or line 89 positioned horizontally between the opening sets and extending vertically across the front face of the receptacle unit housing. This front wall 84 also has a pair of circuit indicator openings 91 and 92 extending therethrough and positioned for association with the respective opening sets 87 and 88.

The housing 83 of receptacle unit 81 interiorly defines first and second compartments 93 and 94 which are respectively positioned behind the opening sets 87 and 88, which compartments are at least partially separated from one another by an interior housing partition 95. The compartment 93 mounts a first set of three conductive plates 96, 97 and 98 which are disposed and spaced in electrically isolated relationship to one another and which respectively define the ground, neutral and live (or power) conductors. Each of plates 96-98 has a blade or prong-receiving electrical contact 99 fixedly formed thereon, with these three contacts 99 being individually and respectively positioned directly behind and aligned with the prong-receiving openings G', N' and L' associated with the receptacle of the first opening set 87 so as to electrically matingly engage with the prongs of a conventional electrical plug.

The ground conductive plate 96 also has a further prong-receiving electrical contact or terminal 101 or 102 provided thereon and projecting rearwardly through the rear housing wall 86. This latter wall 86 has a pair of tubular plastic shrouds 103 and 104 projecting in cantilevered relationship horizontally rearwardly therefrom in both sidewardly and vertically spaced relationship to one another. The ground conductive plate 96 is provided with only one of the terminals 101 and 102 thereon, which terminals are positionally mounted on the conductive plate 96 in horizontally sidewardly and vertically spaced relation. When the terminal 101 is provided, then it projects outwardly through the shroud 103 and is adapted for engaging the common ground G1 of the system. On the other hand, when the ground conductive plate 96 is provided with the terminal 102 thereon, then this latter terminal projects through the shroud 104 and is adapted for engagement with the isolated ground G2 of the system.

The neutral and power conductive plates 97 and 98 respectively define thereon vertically elongate plate parts 106 and 107 which define therebetween a vertically elongate guide channel which is disposed directly behind the circuit-indicator opening 91. Electrically conductive sliders 108 and 109 are respectively mounted on the conductive plate parts 106 and 107 and are vertically slidable therealong. These conductive sliders 108 and 109 respectively mount thereon electrically conductive prong-receiving contacts or terminals 111 and 112 which project rearwardly of the receptacle unit housing for engagement with mating prongs on the power block, as explained below. The two conductive sliders 108 and 109 in turn are stationarily mounted on a unitary slider 113 which is typically constructed in one piece of an electrically nonconductive material such as a plastics material. This slider 113 is positioned generally interiorly of the receptacle unit housing and includes a pair of generally tubular plastic shrouds 114 and 115 which project horizontally outwardly through respective vertically-elongate slots 116–117 which are provided in the rear housing wall 86. These slots are sidewardly spaced apart and, while of generally the same vertical length, are vertically staggered to accommodate the vertically displaced relationship between the shrouds 114–115. These latter shrouds respectively accommodate therein the terminals 111 and 112.

The vertical slidable confinement of the slider shrouds 114–115 within the slots 116–117, the stationary mounting of the conductive sliders 108–109 on the nonconductive slider 113, and the vertical slidable engagement of the sliders 108–109 on the conductive guide plates 106–107 thus define an overall circuit-selecting slider assembly 121 which can be vertically moved along the slots 116–117 between upper, intermediate and lower positions so that the movable prong-receiving terminals 111–112 can be moved between three positions for selective engagement with either the L1, N1 or L2, N2 or L3, N3 contacts associated with connector portion 48 of the power block to permit the receptacle defined by opening set 87 to be joined to any one of the three circuits which extend throughout the electrical system. The selection of one of the three circuits, however, is independent of which ground G1 or G2 is selected, the latter being determined by whether the ground conductive plate 96 is provided with terminal 101 or 102 for respective engagement with the common ground G1 or the isolated ground G2.

The nonconductive slider 113 also mounts thereon an indicator member 118 which includes a vertically-elongate plate part 119 which is disposed directly between the conductive plate parts 106–107 and is vertically slidable within the channel defined therebetween. This indicator plate part 119 has visual indicia such as "1", "2", and "3" provided on the face thereof in vertically spaced relationship so that a selected one of such indicia is visible through the indicator opening 91 to provide a visual indication as to which of the three circuits has been selected.

As to the other opening set 88 provided in the receptacle unit 81, the respective interior compartment 94 is provided with a further set of three electrically conductive plates 96', 97' and 98' mounted therein in spaced and electrically insulated relationship to one another, which plates again have individual prong-receiving contacts 99' thereon which respectively cooperate with the individual openings which define the receptacle of the second set 88 to create electrical engagement with a conventional three-prong electrical plug. The ground conductive plate 96' is again provided with either a prong-receiving terminal 101' or 102', but not both, thereon, which terminals 101' and 102' are positioned to project outwardly through and be generally encased within respective tubular shrouds 103' and 104' which are also fixed to and project outwardly from the rear housing wall 86. This latter wall 86 also has a further pair of vertically elongate slots 116' and 117' formed therethrough in generally vertically aligned relationship below the shrouds 103' and 104' for slidably accommodating and guiding the respective tubular shrouds 114' and 115' associated with the nonconductive slider 113' of a further circuit-selecting slider arrangement 121', which arrangement 121' cooperates with the neutral and live conductive plates 95' and 96'. The circuit-selecting slider arrangement 121' is substantially identical to the arrangement 121 described above, and hence corresponding parts thereof have been designated by the same reference numerals with the addition of a prime (') thereto. These circuit-selecting slider arrangements 121 and 121' are manually operable for permitting circuit selection in the same manner, except that each arrangement 121 and 121' can be independently operated so that each can permit independent circuit selection between the three available circuits. Again, the circuit selection provided by arrangement 121' is independent of whether the receptacle unit is provided with either the ground terminal 101' or 102', the latter permitting the receptacle defined by opening set 88 to be connected to common ground G1 or isolated ground G2, respectively.

In the embodiment of the receptacle unit 81 illustrated by FIGS. 14–18, the ground conductive plates 96 and 96' are each manufactured in two versions, one version having solely the terminal 101 adapted for engagement with the common ground G1 of the system, and the other version having solely the terminal 102 adapted for engagement with the isolated ground G2 of the system. By selectively choosing one ground conductive plate 96 and 96' of each pair, the receptacle unit 81 can be manufactured in four versions, a first version being where both ground conductor plates 96 and 96' are provided with the terminals 101 and 101' so that both receptacles 87 and 88 connect to the common ground G1, a second version where the two ground plates 96 and 96' are provided with the terminals 102 and 102' so that both receptacles 87 and 88 connect to the isolated ground G2, a third version where the ground plates 96 and 96' are respectively provided with the terminals 101 and 102' so that the receptacles 87 and 88 respectively couple to the grounds G1 and G2, and a fourth version where the ground plates 96 and 96' are respectively provided with the terminals 102 and 101' so that the receptacles 87 and 88 respectively connect to the grounds G2 and G1.

The four projecting shrouds 103–104 and 114–115, and the associated three terminals 101 (or 102), 111 and 112, define a connecting part 122 which is adapted to create a plug-type engagement with a connector portion 48 provided on the power block 16, 17 so as to electrically connect the receptacle 87 to the selected circuit. Similarly, a similar connecting part 122' is associated with the other receptacle 88 and creates a plug-type engagement with the connector portion 49 of the power block so that the receptacle 88 is connected to a selected circuit which runs through the power block. Hence, prior to connecting the receptacle unit 81 to the power block 16-17, the user can readily select either the same or different circuits for accessibility through the receptacles 87 and 88, and one or both of these receptacles may be connected to the isolated ground G2, or alternately to the common ground G1, depending upon which receptacle unit is selected. When the receptacle unit is then joined to the power block, the user can plug in different types of electrical appliances to different circuits so as to provide for optimum balance of electrical loads and to also provide for an isolated ground if desired, such as for computer usage. As an example, if receptacle 87 is connected to the isolated ground G2, then such receptacle can be switched for engagement with circuit 3 and utilized for powering a computer. The directly adjacent receptacle 88, however, could be connected to the common ground G1 and connected to either of circuits 1 or 2 so that the receptacle can then be used for supplying electrical power to a light or any other type of conventional electrical appliance as used in an office.

While the space-dividing system illustrated by FIG. 1 is of the beam type, it will be apparent that the present invention is also applicable for use on a panel-type space-dividing system 11a, such as illustrated in FIG. 19. In such arrangement the electrical system again extends along an interior channel associated with the portable upright space-dividing panels 12a, such as through a passage or raceway extending along the lower edge of the panels, or alternatively such channel may be at the top edge or midway of the panel substantially at worksurface height. The electrical arrangement mounts on the panels in a generally similar fashion, and electrically connects together and receives receptacle units in the same manner as described above. Further detailed description is therefore believed unnecessary.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an upright interior space-dividing system having at least first and second horizontally-elongated portable space-dividing structures horizontally connected in series, and a multiple-circuit electrical system mounted interiorly of and extending horizontally of said first and second space-dividing structures for transmitting electricity therealong, said system including a horizontally elongated electrical harness fixedly mounted on each of said first and second space-dividing structures and flexible electrical jumper means extending between and releasably joined to the harnesses of said first and second space-dividing structures for transmitting electricity therebetween, each said harness including a pair of power blocks joined by electrical conductor means which includes a plurality of separate electrical conductors for defining plural electrical circuits, each said power block having electrical conductors therein which define said plural electrical circuits and an electrical connecting portion which is coupled to said plural circuits, said connecting portion being releasably engageable with a compatible electrical connecting part provided adjacent an end of said jumper means, comprising the improvement wherein:

each said power block includes first and second electrical connector portions provided on at least one side thereof and each coupled to said plural circuits;

a portable and unitary receptacle unit removable coupled to at least one said power block for electrical connection to at least one of said electrical circuits;

said receptacle unit including (a) a housing, (b) first and second three-hole electrical receptacles accessible through a first sidewall of said housing so that each said receptacle can accommodate an electrical plug, (c) first and second electrical conductor means disposed interiorly of said housing and cooperating solely with and defining said first and second receptacles respectively, each of said first and second conductor means including a set of three electrically conductive members which are electrically insulated from one another, the set of three conductive members defining said first receptacle being electrically insulated from the set of three conductive members which define said second receptacle, (d) first and second electrical connector parts associated with a second sidewall of said housing and respectively associated with said first and second conductor means, said first and second connector parts being releasably engageable with the respective first and second connector portions on said one power block by means of a pluglike engagement for creating an electrical and a structural connection between said one power block and said receptacle unit, and (e) first and second circuit-selecting means movably mounted on said housing and associated with the electrically conductive members of the respective first and second sets for permitting said first and second receptacles to be selectively and independently joined to any one of at least two different circuits as provided at said one power block.

2. A system according to claim 1, wherein said first and second circuit-selecting means are respectively associated with and comprise a part of said first and second connector parts, each of said first and second connector parts including solely three electrical terminals with at least two of said three terminals being movable for circuit-selection purposes, the set of three terminals associated with each said connector part being selectively engageable with contacts associated with the respective connector portion on the power block when said receptacle unit is mounted thereon.

3. A system according to claim 2, wherein each said circuit-selecting means includes a unitary but independently movable slider which is slidably mounted on said housing and which mounts said two terminals thereon.

4. A system according to claim 3, wherein said set of electrically conductive members as associated with each receptacle includes ground, neutral and power conductive members, said two terminals as mounted on said slider being power and neutral terminals and being disposed in slidable but electrical engagement with the respective power and neutral conductive members, said ground conductive member having a ground terminal associated therewith, the respective connector part including four protective shrouds fixed to and projecting from said housing, two of said shrouds being fixed to said slider and respectively having the neutral and power terminals positioned therein, and said ground terminal being positioned in one of the remaining third and fourth shrouds.

5. A system according to claim 4, wherein said third and fourth shrouds are fixed to said housing, and wherein the other of said third and fourth shrouds is free of terminals.

6. A system according to claim 5, wherein said first and second connector parts respectively include first and second ground terminals which are respectively connected to first and second ground contacts associated with the power block, wherein the ground terminal associated with said first connector part is mounted in said third shroud and engages said first ground contact when said first connector part is engaged with said first connector portion, and the ground terminal of said second connector part is mounted in said fourth shroud for engagement with said second ground contact when the second connector part is engaged with the second connector portion.

7. A system according to claim 6, wherein each of said first and second connector portions on said power block includes a set of at least six electrical contacts including said first and second ground contacts, first and second live contacts and first and second neutral contacts, each of said six contacts being individually connected to a separate said electrical conductor positioned within said power block, and said first and second connector parts each being defined solely by the respective three terminals so as to engage only a selected single live and neutral contact of the respective connector portion.

8. In an interior upright space-dividing system having at least first and second portable upright space-dividing structures horizontally connected in series, and a multiple circuit electrical system positioned interiorly of and extending longitudinally of said first and second space-dividing structures for transmitting electricity therealong, said system including power block means stationarily mounted on each of said first and second space-dividing structures and elongate flexible electrical jumper means extending between and releasably connected to the power block means on said first and second space-dividing structures for transmitting electricity therebetween, said power block means having a plurality of electrical conductors associated therewith including at least one ground conductor, at least one neutral conductor and at least first and second power conductors for defining at least two circuits, said electrical system also including a portable receptacle unit releasably connectable to either of said power block means, the improvement comprising:

said power block means having first and second electrical connector portions which include pluralities of first and second electrical contacts respectively, each said plurality as associated with the respective first and second connector portions including a said contact connected to the ground conductor and a said contact connected to the neutral conductor, said plurality of contacts as associated with each of said first and second connector portions also including first and second said contacts which are respectively connected to the first and second power conductors, the plurality of contacts associated with said first connector portion being independent of the plurality of contacts defining said second connector portion;

said receptacle unit having first and second electrical connector parts provided thereon and being simultaneously electrically engageable with the respective first and second connector portions to create pluglike electrical connections between said receptacle unit and said power block means;

said receptacle unit including first and second electrical receptacle means respectively defining first and second three-hole electrical receptacles for individual engagement with electrical plugs, said first and second electrical receptacle means being electrically isolated and independent of one another and being respectively electrically coupled to said first and second connector parts; and first and second circuit-selecting means movably mounted on said receptacle unit and respectively associated with said first and second receptacle means for permitting each of said first and second receptacles to be independently selectively electrically joined to either one of two circuits as defined by the first and second power conductors in said power block means.

9. A system according to claim 8, wherein each said receptacle means is defined solely by three conductive elements including single ground, neutral and power elements disposed in electrically insulated relationship to one another, each said connector part including a set of solely three electrical terminals including single ground, neutral and power terminals which are respectively associated with the ground, neutral and power conductive elements, and said circuit-selecting means including means mounting the respective power terminal for movement between first and second positions whereby the power terminal respectively electrically engages respective first and second power contacts on the respective connector portion when the receptacle unit is coupled to the power block means.

10. A system according to claim 9, wherein the power block means includes first and second said ground conductors, each said connector portion including first and second said ground contacts respectively connected to said first and second ground conductors, the ground terminal associated with said first connector part being engageable solely with said first ground contact of said first connector portion, and the ground terminal associated with said second connector part being engageable solely with said second ground contact of said second connector portion.

11. A system according to claim 9, wherein said power block means includes first and second said neutral conductors, each said connector portion having first and second neutral contacts respectively associated with said first and second neutral conductors, said circuit-selecting means as associated with each said connector part mounting the respective neutral terminal for movement between first and second positions for respective engagement with the first and second neutral contacts on the respective connector portion.

12. A system according to claim 11, wherein the circuit-selecting means associated with each said connector part includes an independent slider of electrically non-conductive material mounted for sliding movement and mounting the respective power and neutral terminals thereon in stationary but electrically insulated relationship from one another, said power and neutral terminals being maintained in slidable but electrical engagement with the respective power and neutral conductive members, and said ground terminal being fixedly joined to the respective ground conductive member.

13. A system according to claim 8, wherein each of said first and second connector portions includes a set of at least eight said electrical contacts including three power contacts, three neutral contacts and two ground contacts, and wherein each of said first and second connector parts includes only three electrical terminals for engagement with the contacts of the respective connector portion and including a single power, neutral and ground terminal, and said circuit selecting means including means mounting said power and neutral terminals for movement between three different positions so that the power and neutral terminals are disposed for respective engagement with different ones of the power and neutral contacts.

14. A system according to claim 13, wherein the ground terminal on said first connector part engages a first said ground contact which is connected to a first ground conductor associated with the power block means, and wherein the ground terminal associated with said second connector part engages a second said ground terminal of said second connector portion which is joined to a second ground conductor in said power block means which is independent of said first ground conductor.

15. In an interior upright space-dividing system having at least first and second portable upright space-dividing structures horizontally connected in series, and a multiple circuit electrical system positioned interiorly of and extending longitudinally of said first and second space-dividing structures for transmitting electricity therealong, said system including power block means stationarily mounted on each of said first and second space-dividing structures and elongate flexible electrical jumper means extending between and releasably connected to the power block means on said first and second space-dividing structures for transmitting electricity therebetween, said power block means having a plurality of electrical conductors associated therewith including at least one ground conductor, at least one neutral conductor and at least first and second power conductors for defining at least two circuits, said electrical system also including a portable receptacle unit releasably connectable to either of said power block means, the improvement comprising:

said power block means having first and second electrical connector portions associated with one side thereof, said first and second connector portions being disposed in sidewardly-spaced relationship from one another;

said power block means having at least eight electrical conductors associated therewith and maintained in electrically insulated relationship from one another, said electrical conductors including three power conductors, three neutral conductors and two ground conductors;

each of said first and second electrical connector portions including a set of eight electrical contacts positioned adjacent and accessible from the one side of said power block means, each said set of contacts including three power contacts, three neutral contacts and two ground contacts, each said contact being fixedly and electrically connected to a respective one of said electrical conductors;

the set of contacts associated with each of said first and second connector portions including first and second subsets each including four said contacts, the contacts of each subset being disposed in vertically-spaced relationship along a generally vertically-extending row, and the two subsets of contacts defining two adjacent but sidewardly-spaced vertically-extending rows, the contacts of one said row being vertically offset relative to the contacts of the other said row; and said receptacle unit having first and second electrical connector parts respectively electrically connected to first and second receptacles which are externally accessible through a sidewall of said receptacle unit, said first and second connector parts each including a separate set of electrical terminals which are electrically and structurally engageable with selected contacts of the respective first and second connector portions when said receptacle unit is connected to said power block means.

* * * * *